US010416327B2

(12) United States Patent
Akcelik et al.

(10) Patent No.: US 10,416,327 B2
(45) Date of Patent: Sep. 17, 2019

(54) METHOD FOR GENERATING MULTIPLE FREE SEISMIC IMAGES (71) Applicants: Volkan Akcelik, Spring, TX (US); Jerome R. Krebs, Houston, TX (US)

(72) Inventors: Volkan Akcelik, Spring, TX (US); Jerome R. Krebs, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 208 days.

(21) Appl. No.: 15/071,393

(22) Filed: Mar. 16, 2016

(65) Prior Publication Data
US 2016/0356903 A1 Dec. 8, 2016

Related U.S. Application Data (60) Provisional application No. 62/171,114, filed on Jun. 4, 2015.

(51) Int. Cl.
*G06F 19/00* (2018.01)
*G01V 1/40* (2006.01)
*G01V 3/18* (2006.01)
*G01V 5/04* (2006.01)
*G01V 9/00* (2006.01)
*G01N 15/08* (2006.01)
*G01V 1/28* (2006.01)
*G01V 1/38* (2006.01)
*G01V 1/30* (2006.01)

(52) U.S. Cl.
CPC .............. *G01V 1/282* (2013.01); *G01V 1/28* (2013.01); *G01V 1/38* (2013.01); *G01V 1/301* (2013.01); *G01V 1/306* (2013.01); *G01V 2210/32* (2013.01); *G01V 2210/56* (2013.01); *G01V 2210/614* (2013.01)

(58) Field of Classification Search
None
See application file for complete search history.

(56) References Cited

U.S. PATENT DOCUMENTS

| | | |
|---|---|---|
| 3,812,457 A | 5/1974 | Weller |
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |

(Continued)

FOREIGN PATENT DOCUMENTS

| | | |
|---|---|---|
| CA | 2 796 631 | 11/2011 |
| EP | 1 094 338 | 4/2001 |

(Continued)

OTHER PUBLICATIONS

Morgan, J., et al. (2013) "Next-generation seismic experiments: wide-angle, multi-azimuth, three-dimensional, full-waveform inversion", *Geophysical Journal International*, vol. 195, No. 3, pp. 1-22.
Ramos-Martinez, J. et al. (2013) "Reflection FWI from fully deghosted towed-streamer data: A field data example" *SEG Technical Program Expanded Abstracts*, pp. 887-891.
U.S. Appl. No. 14/329,431, filed Jul. 11, 2014, Krohn et al.
U.S. Appl. No. 14/330,767, filed Jul. 14, 2014, Tang et al.
Zhang, D. et al., "Least-squares reverse time migration of multiples," *Geophysics* 79, pp. S11-S21 (2013).

*Primary Examiner* — Calvin Y Choi
(74) *Attorney, Agent, or Firm* — ExxonMobil Upstream Research Company—Law Department (57) ABSTRACT

A method, including: storing, in a computer storage device, geophysical seismic data that has been separated into a multiple-free component and a multiple contaminated component; performing, with a processor, a first full wavefield inversion process on the multiple-free component of the seismic data, wherein a first subsurface physical property model is generated; determining, with a processor, an extended target reflectivity, wherein the extended target reflectivity includes a reflectivity for each of a plurality of shots; separately performing, with a processor, a second full wavefield inversion process with the multiple contaminated component of the seismic data for each of the plurality of shots using the reflectivity corresponding to each of the plurality of shots, wherein a second subsurface physical property model is generated; and generating, with a processor, multiple-free final subsurface physical property model by combining the first subsurface physical property model and the second subsurface physical property model.

10 Claims, 4 Drawing Sheets

(56) References Cited

U.S. PATENT DOCUMENTS

| | | |
|---|---|---|
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 7,974,824 B2 | 7/2011 | Song |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 2002/0049540 A1 | 4/2002 | Beve et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |

(56) References Cited

U.S. PATENT DOCUMENTS

| | | |
|---|---|---|
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0310699 A1* | 12/2011 | Robertsson ............ G01V 1/282 367/21 |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0253758 A1* | 10/2012 | Lazaratos ............ G01V 1/282 703/2 |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0028052 A1* | 1/2013 | Routh ..................... G01V 1/28 367/43 |
| 2013/0060539 A1 | 3/2013 | Baumstein |
| 2013/0081752 A1 | 4/2013 | Kurimura et al. |
| 2013/0138408 A1* | 5/2013 | Lee ..................... G06F 17/16 703/2 |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2015/0012221 A1 | 1/2015 | Bansal et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

* cited by examiner

METHOD FOR GENERATING MULTIPLE FREE SEISMIC IMAGES

CROSS-REFERENCE TO RELATED APPLICATION

This application claims the benefit of U.S. Provisional Patent Application 62/171,114, filed Jun. 4, 2015, entitled METHOD FOR GENERATING MULTIPLE FREE SEISMIC IMAGES, the entirety of which is incorporated by reference herein.

FIELD OF THE INVENTION

Exemplary embodiments described herein pertain generally to the field of geophysical prospecting, and more particularly to geophysical data processing. An exemplary embodiment can invert unprocessed data that contains multiple reflections through full wavefield inversion (FWI), and generate multiple artifact free seismic images.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic inversion is a process of extracting subsurface information from the data measured at the surface of the earth acquired during a seismic survey. In a typical seismic survey, seismic waves are generated by a source positioned at desired locations. As the source generated wave propagates through the subsurface, some of the energy reflects from subsurface interfaces and travels back to the receiver locations where it is recorded. The seismic waves that have been reflected once are called primary reflections. In contrast, multiple reflections are the seismic waves that have been reflected more than once before being recorded by the receivers. Multiples can be characterized as (i) free-surface related multiples, and (ii) internal multiples. The former are those multiples that are reflected from the top surface and will disappear if that surface becomes non-reflecting.

Figure 1:
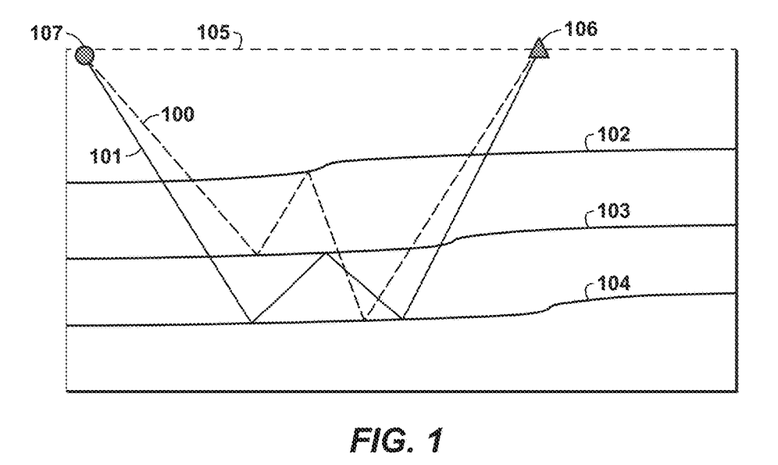
FIG. 1 illustrates examples of inter-bed multiples.

FIG. 1 provides an example of inter-bed multiples. Source 107 emits two seismic waves 100 and 101. FIG. 1 depicts how waves 100 and 101 can reflect from reflectors 102, 103, and 104 as they travel to receiver 106. FIG. 1 assumes free surface 105.

Figure 2:
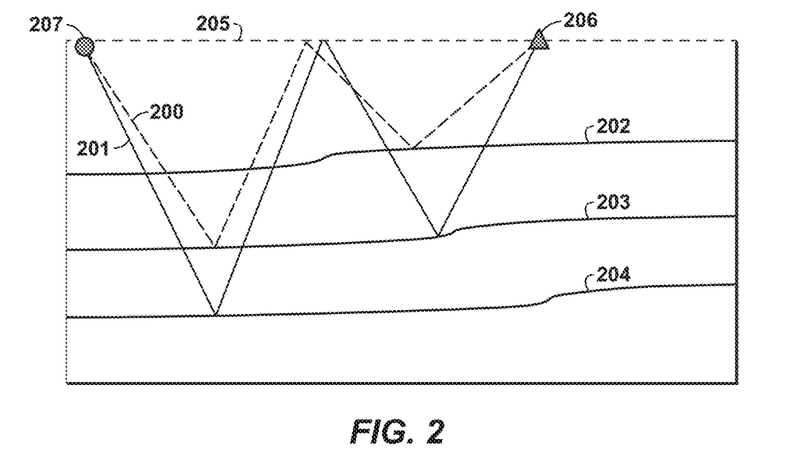
FIG. 2 illustrates examples of free-surface multiples.

FIG. 2 provides an example of free surface multiples. Source 207 emits two seismic waves 200 and 201, which are received by receivers 206. FIG. 2 depicts how waves 200 and 201 reflect off of reflectors 202, 203, and 204, and free surface 205.

Most seismic imaging methods uses only primary data and treat multiple data as noise (i.e., unwanted features in the data) that needs to be removed during conventional data processing. There are several methods for multiple suppression methods in industry. For example, suppression methods include surface-related multiple elimination (SRME), shallow water demultiple (SWD), model-based water-layer demultiple (MWD), and predictive deconvolution. Those of ordinary skill in the art are familiar with these suppression methods, and further discussion is not needed. However, all of the methods struggle with multiple elimination if the multiple and primary reflections overlap in the recorded seismic data. Furthermore, inadequate application of multiple suppression methods may result in damage to the primary data, rendering it unusable for inversion. All of these methods suffer as multiples and primaries are difficult to separate, data processing can damage primary data, and image quality can be degraded.

Full waveform inversion (FWI) is a seismic imaging method which can utilize the full seismic record including events that are treated as "noise" by standard inversion algorithms. FWI creates a model which, when used to drive numerical simulation, optimally matches the measured data. The numerical simulations can generate data with or without free-surface-related multiples depending on the free-surface boundary condition. The free-surface boundary condition generates data with surface-related multiples, while the non-reflecting (absorbing) boundary condition allows for generation of data free from surface-related multiples. Internal multiples are present in both types of surface boundary conditions.

The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model.

Numerical simulation can generate data with or without free surface multiples depending on the free surface boundary condition imposed on the top of the subsurface model. The free surface boundary condition yields data with surface-related multiples, while the transparent (absorbing) boundary condition allows for generation of multiple-free data. These two modes of numerical modeling lead to two standard approaches in FWI.

In a first approach, FWI can utilize input seismic data having undergone some kind of multiple suppression procedure and uses an absorbing boundary condition to model the synthetic data. This approach only suppresses free surface multiples and its success hinges on the multiple suppression techniques. In a second FWI approach, the data still contain surface-related multiples which have to be modeled by using a free-surface boundary condition.

The second approach saves both time and resources required by conventional multiple processing methods. Furthermore, it ensures that integrity of the data is not compromised. The drawback of the second approach is that it requires an accurate modeling of surface-related multiples. This is extremely difficult for several reasons: (i) residuals in the multiple data are very sensitive to the error in the reflectivity of the primary reflector (e.g., the water bottom reflectivity for the surface related multiple) and (ii) field data might include reflections that cannot be modeled by the given synthetic numerical model (such as elastic affects, attenuation and anisotropy). The most crucial impediment is that even a small data mismatch between the measured and simulated multiples can create undesired multiple artifacts in the image.

U.S. Pat. No. 7,974,824, the entire contents of which are hereby incorporated by reference, describes the seismic inversion of data containing surface-related multiples. Instead of pre-processing seismic data to remove surface-related multiples, a seismic waveform inversion process enables comparison of simulated seismic data containing surface-related multiples with observed seismic data also containing surface-related multiples. Based on this comparing, a model of a subterranean structure can be iteratively updated.

Zhang and Schuster (2013) describes a method where least squares migration (LSM) is used to image free-surface multiples where the recorded traces are used as the time histories of the virtual sources at the hydrophones and the surface-related multiples are the observed data. Zhang D. and Schuster G., "Least-squares reverse time migration of multiples," Geophysics, Vol. 79, S11-S21, 2013, the entire contents of which are hereby incorporated by reference.

SUMMARY

A method, including: storing, in a computer storage device, geophysical seismic data that has been separated into a multiple-free component and a multiple contaminated component; performing, with a processor, a first full wavefield inversion process on the multiple-free component of the seismic data, wherein a first subsurface physical property model is generated; determining, with a processor, an extended target reflectivity, wherein the extended target reflectivity includes a reflectivity for each of a plurality of shots; separately performing, with a processor, a second full wavefield inversion process with the multiple contaminated component of the seismic data for each of the plurality of shots using the reflectivity corresponding to each of the plurality of shots, wherein a second subsurface physical property model is generated; and generating, with a processor, multiple-free final subsurface physical property model by combining the first subsurface physical property model and the second subsurface physical property model.

The method can further include: creating, with a processor, an image of the subsurface region from the multiple-free final subsurface physical property model.

The method can further include: using the multiple-free final subsurface physical property model in interpreting a subsurface region for hydrocarbon exploration or production.

In the method, the extended target reflectivity can be used as a starting model in the second full wavefield inversion process in order to minimize reflections from the target reflector.

In the method, the target reflector can be a water bottom.

In the method, the target reflector can be a salt body.

In the method, the determining can include determining the unique reflectivity of the target reflector for each of the plurality of shots from an iterative inversion of the multiple contaminated component of the seismic data, wherein reflectivity is the only inversion variable.

In the method, the inversion parameter can be muted everywhere in the iterative inversion but at the target reflector in order to obtain the reflectivity of the target reflector for each shot separately.

In the method, the extended target reflectivity can be used as a starting model in the second full wavefield inversion process, and the second full wavefield inversion process is applied to the multiple contaminated component of the seismic data.

In the method, the extended target reflectivity can include a unique reflectivity of the target reflector for each shot.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DESCRIPTION OF THE INVENTION

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

An exemplary embodiment of the present technological advancement can remove the multiple artifacts caused by given selected reflector(s). In effect, the present technological advancement transforms seismic data into a model of the subsurface with these multiple artifacts removed or suppressed. Embodiments of the present technological advancement do not require a conventional multiple suppression technique. In addition, the present technological advancement can assume that the field data might include constructive noise (such as elastic affects, attenuation affects) that cannot be modeled by the numerical simulation.

The non-limiting embodiments described below pertain to a workflow for removing artifacts generated by the water bottom multiples. A water bottom multiple is caused by sound waves bouncing twice between the sea surface and the sea bed, wherein the ray paths lie entirely within the water layer. The artifact created in the data by a water bottom multiple is a water bottom multiple artifact. The artifact arises because water has a substantially different acoustic impedance than the earth formations at the bottom of the water (or sea floor). The present technological advancement is not restricted to water bottom multiples and can be extended to other types of multiples caused by any reflector(s).

Figure 3:
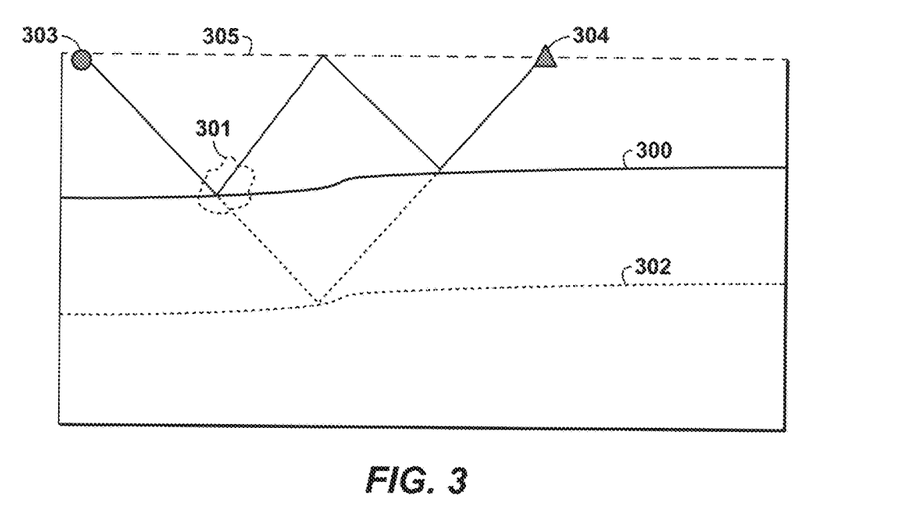
FIG. 3 illustrates an ambiguity in a water-bottom artifact.

FIG. 3 illustrates an ambiguity between the real reflector (water bottom 300) and a fake reflector (a reflector that does not exist in the subsurface; water bottom multiple artifact 302). The solid line in FIG. 3 represents that actual path taken by the seismic wave emitted from source 303 and received receiver 304, which was reflected off of the free surface 305 and the water bottom 300 (the interface of the base of the water and the rock or sediment beneath it). The dashed line represents an ambiguity because the data recorded by the receiver could indicate a presence of fake reflector 302 beneath the water bottom. This ambiguity is the source of an artifact in the data (see, for example, FIG. 6A). In FIG. 3, only water bottom reflector 300 can create the primary reflection 301. However, both water bottom 300 and the fake reflector 302 can create the same multiple reflection, thereby creating a dangerous ambiguity that might cause leakage of multiple artifacts into the seismic image. Since the main reflector (water bottom 300) cannot create reflections that can match all relevant primary and multiple events, the present technological advancement uses the fake reflector 302 to minimize the residual in the multiples. It is important to note that, even with the help of the fake reflector, the multiple residual is reduced to a minimum; which is not necessarily zero. Once the multiple artifact (the fake reflector) leaks into the inverted model, experience shows that FWI does not remove it completely in the later nonlinear iterations. Thus, it is advantageous that the present technological advancement can remove the multiple artifact.

To remedy the above-noted ambiguity, when applying FWI to unprocessed data, one of the following approaches can be used. A first approach is to find an effective water bottom reflectivity that matches the multiples and primaries very accurately. This approach is the most desired, but very difficult to accomplish with field data. To find an effective water bottom reflectivity, one needs to know the structure around the water bottom, which is part of the unknown image. However, the most important impediment to the first approach is the difficulty of finding an effective water bottom reflectivity when there is constructive noise in the data. In the presence of constructive noise, there might be no effective water bottom that matches both the primary and multiple reflections accurately for all the shots and all the reflection angles for all shot-receiver pairs (especially for shallow water applications). For this reason, this first approach can only be pursued when the physics of simulation are consistent with field data. The second approach is to remove the multiple residual with optimization techniques by introducing "extra non-physical degrees of freedoms," which is hereinafter referred to as "extended water-bottom reflectivity," removing the multiple residual without damaging the primary reflections (or not touching primary residual with the introduced extra degrees of freedom), and inferring the remaining primary reflections using a conventional FWI workflow. The present technological advancement implements this second approach, as discussed below.

The extended water bottom is described as having non-physical degrees of freedom because the extended water bottom does not represent the true Earth. Rather, as discussed below, unique water bottoms are assumed for each shot, which do not represent the true Earth, and are used as a tool to minimize or eliminate the multiple artifact.

Figure 4:
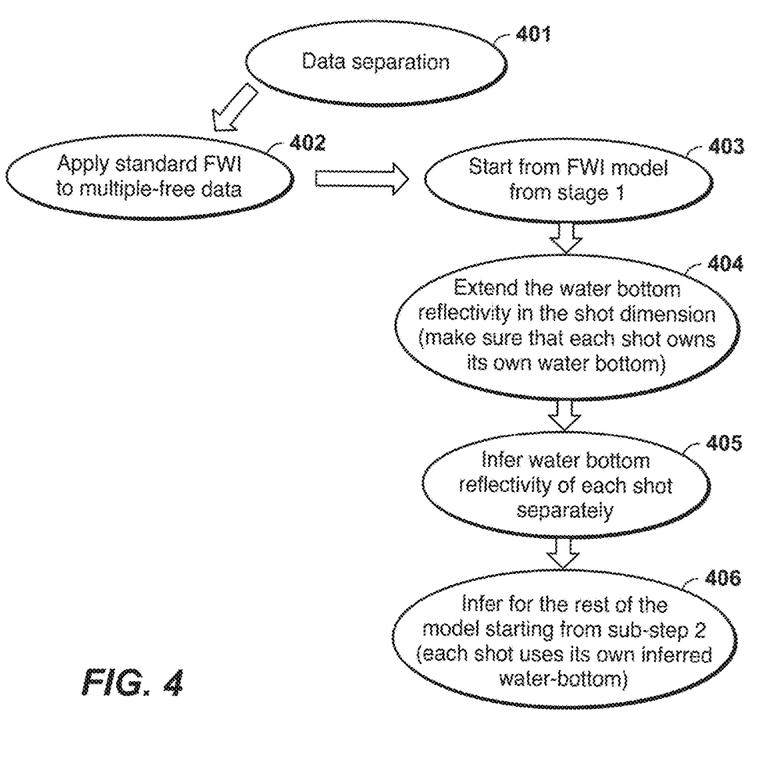
FIG. 4 is an exemplary flow chart of a method embodying the present technological advancement.

FIG. 4 illustrates an exemplary method embodying the present technological advancement. Step 401 includes separating the data 500 into two parts: the multiple free part 501 and multiple contaminated part 502 (See FIG. 5 as an example). The multiple contaminated part is a combination of primary and multiple reflections. The separating can be accomplished by applying a low-pass filter to the seismic signal recordings. The cut-off frequency of the low-pass filter can be selected to be the highest frequency expected to be contained in the primary reflections. The signals output from the low-pass filter contain the primary reflections (e.g., 501 in FIG. 5) essentially in their entirety and the low-frequency portion of the multiple reflections (e.g., 502 in FIG. 5). Alternatively, the data separation can be done by first calculating (approximately) the travel time of the multiple reflections, and then windowing the data to isolate the part containing multiple reflections. However, other separation techniques are known to those of ordinary skill in the art and can be used with the present technological advancement.

Figure 5:
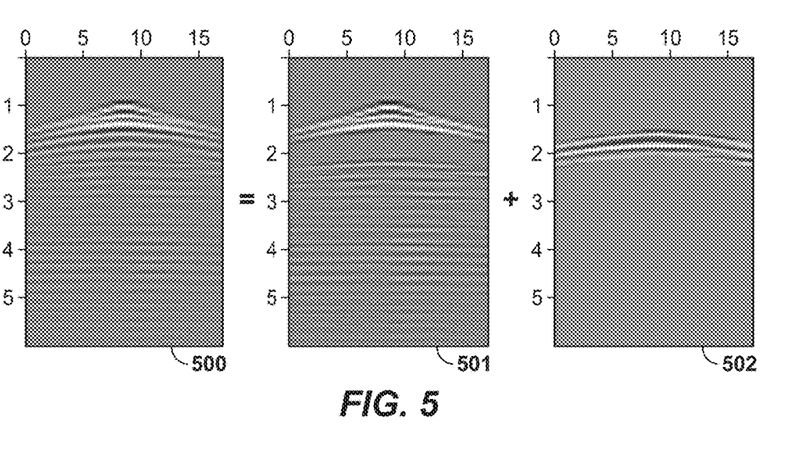
FIG. 5 illustrates data separation into multiple free data and multiple data.

Step 402 includes generating a subsurface physical property model from the multiple free part 501 using conventional FWI. FWI is well-known to those of ordinary skill in the art. FWI can utilize an initial geophysical property model, with a free-surface boundary condition, and synthetic data can be generated from the initial geophysical property model. Generating and/or obtaining synthetic data based on an initial geophysical property model is well known to those of ordinary skill in the art. An objective function can be computed by using observed geophysical data and the corresponding synthetic data. A gradient of the cost function, with respect to the subsurface model parameter(s), can be used to update the initial model in order to generate an intermediate model. This iterative process can be repeated until the cost function reaches a predetermined threshold, at which point a subsurface physical property model is obtained. Further details regarding FWI can be found in U.S. Patent Publication 2011/0194379 to Lee et al., the entire contents of which are hereby incorporated by reference.

Since part 501 is not contaminated with multiples, the conventional FWI process produces a multiple artifact-free image. This FWI inversion would be final if the multiple contaminated data 502 were not mixed with the primary reflection.

The present technological advancement can extract information from the primaries of part 502 while avoiding the multiples. To suppress the multiple residual in part 502 of the data, the present technological advancement utilizes the extended water bottom reflectivity. To this end, a unique water bottom reflectivity is assigned to each shot; in other words the water bottom reflectivity is extended in the shot dimension. Consequently, use of the extended water bottom reflectivity suppresses the multiple artifact in the inverted models generated by the FWI process.

In conventional FWI, all shots share the same model, since the material model (or Earth) is unique. In the extended water reflectivity approach of the present technological advancement, the water bottom is not unique to all shots, but each shot is assigned its own water bottom. The rest of the earth model is unique to all shots.

In step 403, the final subsurface physical property model obtained in step 402 is used as a starting point to process the multiple contaminated data 502.

In step 404, the water bottom reflectivity is extended in the shot dimension (i.e., each shot has its own water bottom). Preferably, each shot has its own unique water bottom. However, the present technological advancement can be applied to situations where some shots share a water bottom reflectivity.

In step 405, an iterative inversion process is applied to part 502 of the data, wherein the iterative inversion process uses the extended water reflectivity as the only inversion variable. This inversion process is analogous to FWI, but at this stage the gradient of a cost function used in this iterative inversion process is muted everywhere but at the extended water bottom to infer for the water bottom reflectivity for each shot separately. In this setup, the FWI type processes minimizes the multiple residual-residual created by multiple reflections-using the extended water bottom reflectivity as the inversion variable. Step 405 yields an extended reflectivity that includes a reflectivity of the water bottom for each shot. Each shot can be processed separately in order to arrive at that shots corresponding reflectivity.

Figure 8:
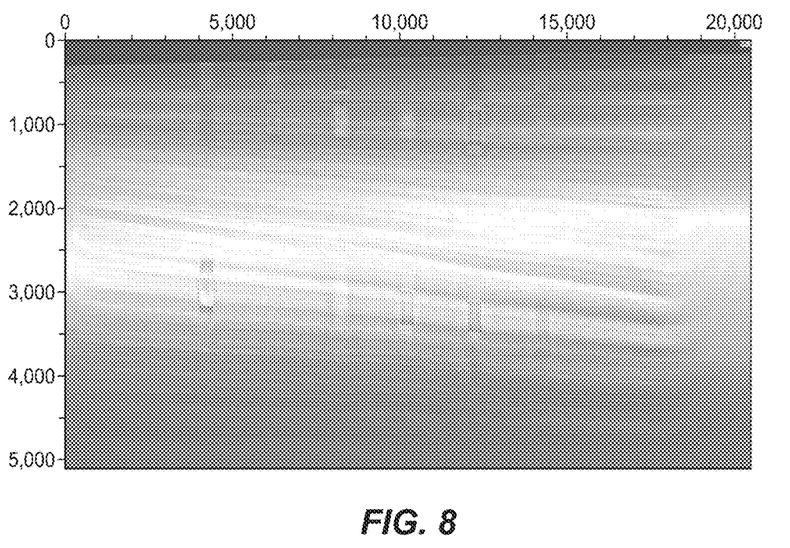
FIG. 8 is an image with no water bottom multiple artifact created with an embodiment of the present technological advancement.

Next, in step 406, using the extended reflectivity as the starting model, the remaining residual from part 502, that is the primary residual-residual created by primary reflections-included within 502, is inferred using FWI, wherein each shot uses its own inferred water bottom. This inversion is applied to the full multiple contaminated data (not only to the primary reflection), but since this step starts from the extended target reflectivity, the residual due to the multiples is zero, and in affect process it is applied to the primary reflection. Then, the subsurface physical property model obtained in step 402 and the subsurface physical property model obtained in step 406 can be summed to arrive at a final subsurface physical property model. The final subsurface physical property model can be used in interpreting a subsurface region for hydrocarbon exploration or production (e.g., imaging, see FIG. 8).

Figure 6A:
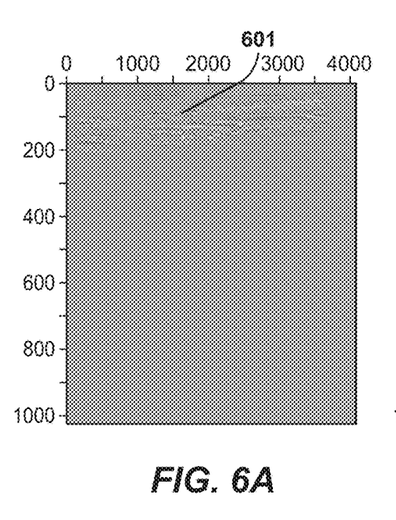
FIGS. 6A and 6B compare conventionally processed seismic data to the same seismic data processed according to the present technological advancement.
Figure 6B:
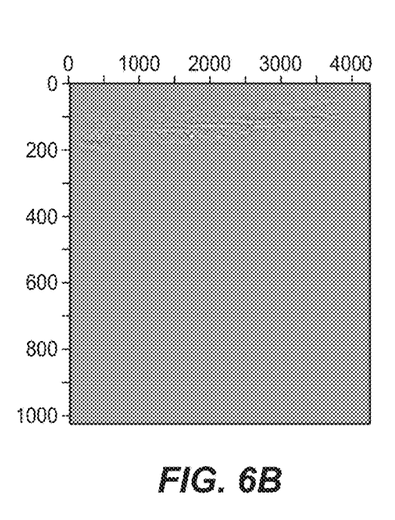

FIG. 6A shows an example of a $V_p$ (velocity of the pressure wave) update using part 502 in a synthetic data test. In FIG. 6A, the update is done without minimizing the multiple residual, where the update is contaminated with multiples artifact (i.e., the same standard water bottom is used for all shots). In FIG. 6B, the update is obtained after the multiple residual is minimized through optimizing the extended water bottom per the present technological advancement; hence the update has no multiple artifacts but only updates from primary residuals. Comparing FIGS. 6A and 6B, one can appreciate that multiple artifact 601 is not present in FIG. 6B.

FIG. 6B is for a single shot $S_1$. The shots $S_1 \ldots S_n$ can be summed to arrive at a subsurface physical property model that does not include the multiple artifact.

Figure 7:
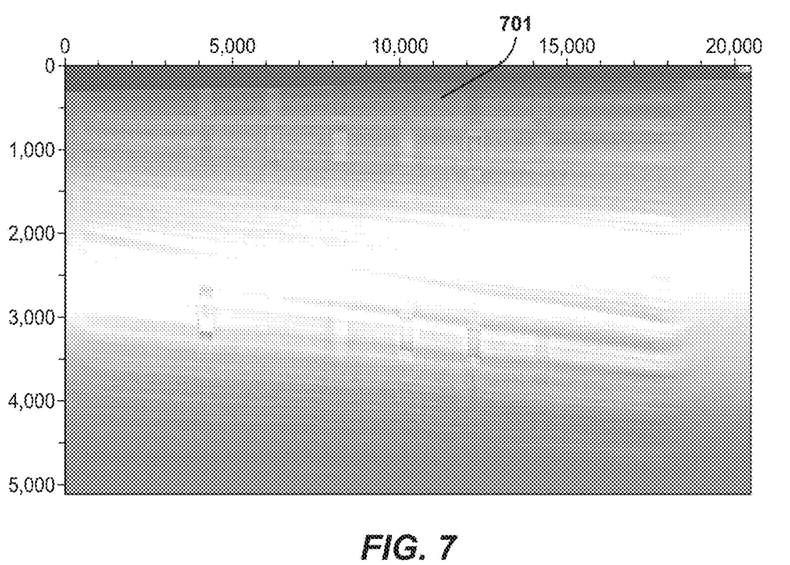
FIG. 7 is an image with a water bottom multiple artifact created with a conventional FWI process.

The final FWI image obtained with conventional FWI (FIG. 7) is contaminated with a water bottom multiple artifact 701. The FWI image obtained with the present technological advancement (FIG. 8) has no water bottom multiple artifact.

While the above embodiment pertains to removal of a water bottom multiple artifact, the present technological advancement can be extended to remove a multiple artifact caused by any given reflector(s). Following the workflow described above, the target reflector is extended in the shot direction and this is used as an extra degree of freedom to remove the multiple residual from the data, and then to infer for the remaining primaries with conventional FWI.

Another application of the present technological advancement is to remove/suppress the multiples caused by salt body interfaces.

Another application of the present technological advancement is to use the results to manage hydrocarbon production. The subsurface images generated with the present velocity models can be used in the exploration for hydrocarbons and improve geophysical prospecting. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In all practical applications, the present technological advancement must be used in conjunction with a computer, programmed in accordance with the disclosures herein. Preferably, in order to efficiently perform FWI, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method, comprising:
   storing, in a computer storage device, geophysical seismic data that has been separated into a multiple-free component and a multiple contaminated component;
   performing, with a processor, a first full wavefield inversion process on the multiple-free component of the seismic data, wherein a first subsurface physical property model is generated;
   determining, with a processor, an extended target reflectivity, wherein the extended target reflectivity includes a reflectivity for each of a plurality of shots;
   separately performing, with a processor, a second full wavefield inversion process with the multiple contaminated component of the seismic data for each of the plurality of shots using the reflectivity corresponding to each of the plurality of shots, wherein a second subsurface physical property model is generated, and further wherein the first subsurface physical property model is used as a starting point in the second full wavefield inversion process performed with the multiple contaminated component of the seismic data; and
   generating, with a processor, multiple-free final subsurface physical property model by summing the first subsurface physical property model and the second subsurface physical property model.

2. The method of claim 1, further comprising:

creating, with a processor, an image of the subsurface region from the multiple-free final subsurface physical property model.

3. The method of claim 1, further comprising:

using the multiple-free final subsurface physical property model in interpreting a subsurface region for hydrocarbon exploration or production.

4. The method of claim 1, wherein the extended target reflectivity is used as a starting model in the second full wavefield inversion process in order to minimize reflections from the target reflector.

5. The method of claim 1, wherein the target reflector is a water bottom.

6. The method of claim 1, wherein the target reflector is a salt body.

7. The method of claim 1, wherein the determining includes determining the unique reflectivity of the target reflector for each of the plurality of shots from an iterative inversion of the multiple contaminated component of the seismic data, wherein reflectivity is the only inversion variable.

8. The method of claim 7, wherein the inversion parameter is muted everywhere in the iterative inversion but at the target reflector in order to obtain the reflectivity of the target reflector for each shot separately.

9. The method of claim 7, wherein the extended target reflectivity is used as a starting model in the second full wavefield inversion process, and the second full wavefield inversion process is applied to the multiple contaminated component.

10. The method of claim 1, wherein the extended target reflectivity includes a unique reflectivity of the target reflector for each shot.

* * * * *